US007929439B1

(12) United States Patent
Underwood et al.

(10) Patent No.: US 7,929,439 B1
(45) Date of Patent: Apr. 19, 2011

(54) MULTIPLE NETWORK INTERFACE CORE APPARATUS AND METHOD

(75) Inventors: Keith D. Underwood, Albuquerque, NM (US); Karl Scott Hemmert, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 316 days.

(21) Appl. No.: 12/243,709

(22) Filed: Oct. 1, 2008

Related U.S. Application Data

(60) Provisional application No. 60/976,963, filed on Oct. 2, 2007.

(51) Int. Cl.
*H04L 12/28* (2006.01)
*H04L 12/66* (2006.01)
(52) U.S. Cl. .................. 370/230; 370/391; 370/463
(58) Field of Classification Search .................. None
See application file for complete search history.

(56) References Cited

U.S. PATENT DOCUMENTS

| | | | | |
|---|---|---|---|---|
| 2005/0067349 A1* | 3/2005 | Crespi et al. | ........... | 210/634 |
| 2008/0071959 A1* | 3/2008 | David et al. | ........... | 710/265 |
| 2008/0089358 A1* | 4/2008 | Basso et al. | ........... | 370/465 |
| 2008/0151922 A1* | 6/2008 | Elzur et al. | ........... | 370/412 |
| 2009/0097499 A1* | 4/2009 | Naghshineh et al. | ........... | 370/463 |
| 2009/0147679 A1* | 6/2009 | Gusat et al. | ........... | 370/232 |

OTHER PUBLICATIONS

Dickman, L., et al., "PathScale InfiniPath: A First Look", Proceedings of the 13th Symposium on High Performance Interconnects (Aug. 2005), from Pathscale (now QLogic, Inc.).
Underwood, K. D., "Challenges and issues in benchmarking MPI", Recent Advances in Parallel Virtual Machine and Message Passing Interface: 13th European PVM/MPI Users' Group Meeting, Bonn, Germany (Sep. 2006), Proceedings, vol. 4192 of Lecture Notes in Computer Science, pp. 339-346 (Springer-Verlag, 2006).
Underwood, K. D., et al., "The Impact of MPI Queue Usage on Message Latency", Proceedings of the International Conference on Parallel Processing (ICPP), Montreal, Canada (Aug. 2004).
Brightwell, R., et al., "A Comparison of 4X InfiniBand and Quadrics Elan-4 Technologies", Proceedings of the 2004 International Conference on Cluster Computing (Sep. 2004).
Brightwell, R., et al., "An Analysis of the Impact of Overlap and Independent Progress for MPI", Proceedings of the 2004 International Conference on Supercomputing, St. Malo, France (Jun. 2004).
Rodrigues, A., et al., "Enhancing NIC performance for MPI Using Processing-in-Memory", Proceedings of the 2005 Workshop on Communication Architectures for Clusters (Apr. 2005).
Underwood, K. D., et al., "A Hardware Acceleration Unit for MPI Queue Processing", 19th International Parallel and Distributed Processing Symposium (Apr. 2005), Proceedings 19th IEEE International, Apr. 4, 2005, 96b.
Underwood, K. D., et al., "Accelerating List Management for MPI", Proceedings of the 2005 IEEE International Conference on Cluster Computing (Sep. 2005).
Beechcroft, J., et al., The Elan5 Network Processor, Proceedings of the International Supercomputing Conference 2007, Dresden, Germany (Jun. 2007).

* cited by examiner

*Primary Examiner* — Chi H Pham
*Assistant Examiner* — Soon-Dong D Hyun
(74) *Attorney, Agent, or Firm* — Madelynne J. Farber

(57) ABSTRACT

A network interface controller and network interface control method comprising providing a single integrated circuit as a network interface controller and employing a plurality of network interface cores on the single integrated circuit.

10 Claims, 3 Drawing Sheets

MULTIPLE NETWORK INTERFACE CORE APPARATUS AND METHOD

CROSS-REFERENCE TO RELATED APPLICATIONS

This application claims priority to and the benefit of the filing of U.S. Provisional Patent Application Ser. No. 60/976,963, entitled "Multiple Network Interface 'Cores' to Increase Message Rate", filed on Oct. 2, 2007, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to network interface controllers and apparatuses and methods to increase message throughput therethrough.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Network bandwidths are continuing to rise rapidly; however, the clock rate of network interface controllers (NICs) is not keeping up. This implies that NICs must increase the amount of parallelism realized to achieve increases in message rate that even match the increase in bandwidth. To compound the problem, the advent of multi-core and many-core processors has stopped the growth in message sizes. This requires additional improvements in the network interface simply to match the improvement in network bandwidth. While multiple NICs have in the past led to significant challenges in implementing multi-rail systems, the present invention uses multiple "cores" within a NIC to enhance message rate without the challenges associated with multi-rail systems.

There has been a recent emphasis on improving message rates for Message Passing Interface (MPI). InfiniPath, L. Dickman, et al., "PathScale InfiniPath: A first look", Proceedings of the 13th Symposium on High Performance Interconnects (August 2005), from Pathscale (now QLogic, Inc.) was the first of a generation of so-called on-load engines that move all responsibility for message processing to the host microprocessor. InfiniPath demonstrated (and touted the fact that) an onload approach could achieve extremely high message rates for MPI under a certain set of scenarios. Recently, Mellanox has released a new series of network interfaces that performs most message processing on the host processor and also touts extremely high MPI message rates.

Studies at Sandia National Laboratories (SNL), however, indicate that the microbenchmarks used to make many of the claims regarding the onload approach have little relationship to realistic scenarios. K. Underwood, "Challenges and issues in benchmarking MPI", Recent Advances in Parallel Virtual Machine and Message Passing Interface: 13th European PVM/MPI Users' Group Meeting, Bonn, Germany (September 2006), Proceedings, volume 4192 of Lecture Notes in Computer Science, pages 339-346 (Springer-Verlag, 2006); and K. D. Underwood et al., "The impact of MPI queue usage on message latency", Proceedings of the International Conference on Parallel Processing (ICPP), Montreal, Canada (August 2004). Indeed, it is often the case that performance enabling features of the network interface, rather than microbenchmarks, have more impact on performance. R. Brightwell, et al., "A comparison of 4× InfiniBand and Quadrics Elan-4 technologies", Proceedings of the 2004 International Conference on Cluster Computing (September 2004); and R. Brightwell et al., "An analysis of the impact of overlap and independent progress for MPI", Proceedings of the 2004 International Conference on Supercomputing, St. Malo, France (June 2004). Recent work at SNL has also demonstrated that offload approaches can achieve high message rates, A. Rodrigues, et al., "Enhancing NIC performance for MPI using processing-in-memory", Proceedings of the 2005 Workshop on Communication Architectures for Clusters (April 2005); K. D. Underwood, et al., "A hardware acceleration unit for MPI queue processing", 19th International Parallel and Distributed Processing Symposium (April 2005); and K. D. Underwood, et al., "Accelerating list management for MPI", Proceedings of the 2005 IEEE International Conference on Cluster Computing (September 2005), while also delivering key network features such as overlap and independent progress.

The impending challenge is two-fold. The scaling of clock rates for standard cell Very Large Scale Integration (VLSI) design has drastically slowed. Thus, offload approaches can no longer linearly increase their performance through increasing clock rate. Instead, they must exploit more parallelism. Onload approaches will face a similar problem. Memory latencies are approaching a floor and the processing of MPI messages is highly sensitive to memory latency. Thus, new solutions to improving message rate are needed.

Quadrics, in the Elan5 adapter, J. Beecroft, et al., "The Elan5 network processor", Proceedings of the International Supercomputing Conference 2007, Dresden, Germany (June 2007), chose a parallel processing approach. In the Elan5 approach, several specialized RISC processors share all resources, including all memories. The seven processors are dedicated to a variety of tasks in a largely pipelined model with two input processors, one management processor, and four processors dedicated to output and general purpose processing.

When there are a small number of host processes, it is necessary to arrange the processing elements such that all of the processing elements can be dedicated to servicing messaging for a single host process. This is the approach that Quadrics chose; however, such a parallel processing approach imposes a number of challenges. Foremost, access to most resources must be arbitrated among the various processors. Among these, arbitrating access to the memory that holds such data structures as the MPI posted receive queue is an overhead that is imposed unnecessarily and that can cause performance degradation due to contention for memory ports.

The use of multiple NIC cores according to the invention eliminates this issue by replicating fully functional NIC cores (as opposed to just the processing logic within the NIC core) and appropriately routing traffic to each. This achieves better scalability in terms of both performance and silicon area by distinguishing resources which must be replicated, resources which can be shared without contention issues, and resources which can be partitioned based on the operational model.

BRIEF SUMMARY OF THE INVENTION

The present invention is of a network interface controller and network interface control method comprising providing a single integrated circuit as a network interface controller and employing a plurality of network interface cores on the single integrated circuit. In the preferred embodiment, a first multiplexer is used for communications between the plurality of network interface cores and one or more host processors. A response reordering queue is employed between the one or more host processors and the first multiplexer. A second multiplexer is used for communications between the plurality of network interface cores and a network router. A content addressable memory is employed between the network router and the second multiplexer. Each of the plurality of network interface cores supports a plurality of parallel programming models, preferably wherein each of the plurality of network interface cores supports both Message Passing Interface and Partitioned Global Address Space programming models, and most preferably employing discrete hardware for the two.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a network interface controller apparatus and method comprising the employment of a network interface with multiple (homogeneous or heterogeneous) network interface cores. The challenge met by the invention is to continue to scale MPI message rates at least as fast as network bandwidths. With the advent of multi-core and many-core microprocessors, MPI message size has ceased growing and may tend to become slightly smaller. Similarly, current technology trends have led to a dramatic reduction in the growth rate of clock frequencies. The network interface needs a mechanism to extract additional parallelism.

Four key insights lead to a system where multiple simple network interface cores are instantiated to form a single network interface. The first insight is that many resources on a network interface can be shared between multiple network interface cores. The second insight is that most of the remaining resources can be split between the multiple cores. The third insight is that, even at the receive side where achieving high message rate is hardest, a many-core processor will typically have numerous cores that each send and receive MPI messages. This allows the processing work to be relatively easily load-balanced across the multiple network interface cores without requiring synchronization between the cores. The final observation is that, as with multi-core processors, it is dramatically easier to implement several copies of a simple network interface core than to implement a network interface that is several times faster.

Thus, the present invention provides a network interface with multiple (homogeneous or heterogeneous) network interface cores. The advantage to this approach is that the performance of the network interface in terms of message rate (messages per second, atomic updates per second, etc.) can be scaled linearly with the number of cores until the bandwidth limit of the network is reached. This is because the network interfaces are completely independent when processing messages. No other approach has been proposed to allow such linear scaling.

Figure 1:
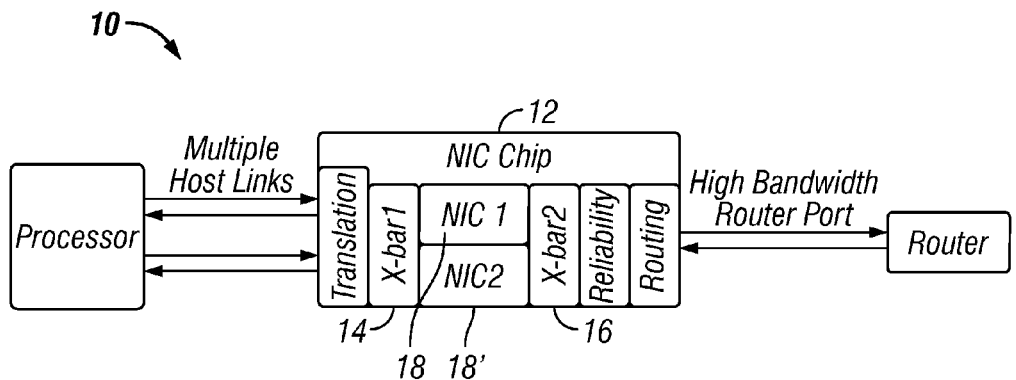
FIG. 1 is a block diagram of the apparatus and method of the invention.

A block diagram of the NIC apparatus 10 of the invention is shown in FIG. 1, preferably embodied on a NIC chip 12 (integrated circuit). A multi-core or many-core processor, or a plurality of processors, is connected to a network interface (NIC) through a plurality of links (two shown). The NIC of the invention comprises multiple NIC cores 18, 18' (two shown) that share several resources for interacting with the router and the processor, including X-bar1 14 and X-bar2 16 units. In turn, the NIC is connected to some number of router ports (one shown) to provide connectivity into the network.

This overall diagram differs from traditional multi-rail devices in several key ways. Foremost, certain resources are shared between the network interface cores to yield a more efficient implementation. Other resources are replicated in ways that they cannot be for a multi-rail system. These details are discussed further below.

While the network interface cores shown are homogeneous (as discussed further below), they do not need to be. Functionality could be further decomposed into more simple, specialized cores, such as cores to support MPI and cores to support PGAS, and provisioned to achieve the desired performance level for each protocol.

One of the most important aspects of using multiple network interface cores is the resources that are replicated. In FIG. 1, what is not shown expressly are the widths of the various data paths. All data paths for each NIC core should be sufficient to deliver the full bandwidth. This simplifies the task of load balancing for large messages and provides a key differentiation from multi-rail approaches. Where multi-rail approaches are forced to stripe data over multiple network interfaces to achieve full bandwidth, the proposed approach can deliver the full bandwidth from a single host core and a single network interface core. This is important since striping solutions frequently face extreme challenges in delivering full bandwidth to one processor core and cannot deliver the full bandwidth using a single NIC.

Of course, the most significant thing to replicate are the functional units and associated logic. The primary reason for having multiple network interface cores is to improve the message rate; thus, all message processing hardware and related data manipulation hardware (e.g., DMA (direct memory access) engines) is replicated. Even some of the intermediate buffers (e.g., FIFOs (first-in first-out queues) in FIG. 5) are replicated. In a typical network interface core implementation, these pieces require relatively little silicon area to implement.

A third set of resources that should be replicated is the command queues used for direct access of the network hardware by the application. Typically, there would be at least one command queue per anticipated processor core in the overall network interface. While these could be partitioned among the network interface cores, they should be replicated in each core to provide improved resilience to failure (i.e., if only one NIC was functional, it could be used for all processes).

What is preferably not replicated are many of the components that require large amounts of silicon area to implement. Instead, these resources are either shared or partitioned depending on their usage model.

One of the strengths of using multiple network interface cores is the fact that many network interface components that consume a significant amount of resources (silicon area, for example) can be shared between the network interface cores by moving it outside of the cores. This includes the sharing of external connections (to the host and to the router) as well as sharing of internal data structure (address translation and reliability logic).

Figure 2:
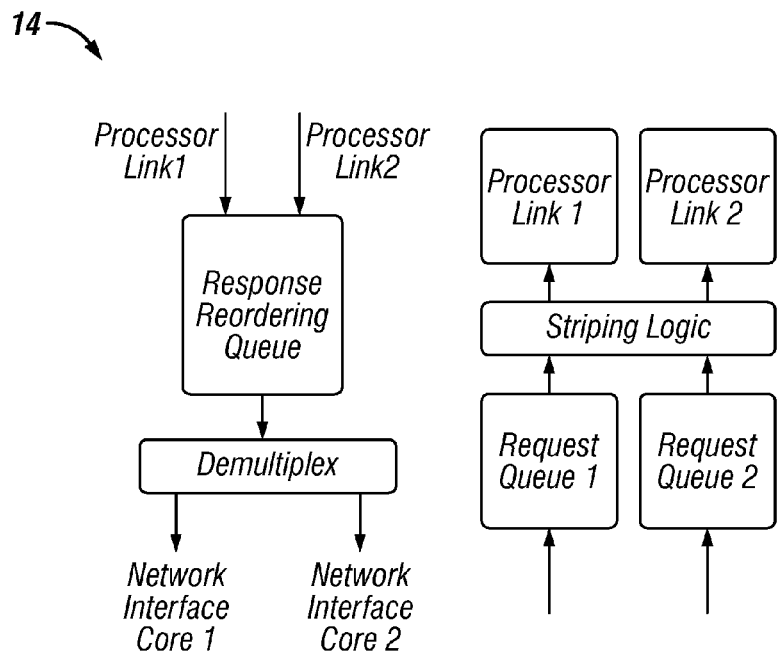
FIG. 2 is a block diagram of the X-bar1 unit of the invention.

One of the ways that the use of multiple network interface cores is fundamentally different from a multi-rail approach is that each of the network interface cores can deliver the full peak bandwidth of the network while multi-rail approaches partition the bandwidth. As pictured in FIG. 1, the two network interface cores share an X-Bar1 14 component that connects them to one or more host processor links. This component, shown in FIG. 2, accepts requests from each of the network interface cores (two shown) and stripes those requests across the available links to the host processor (two shown). It then reassembles the responses from the host (for read requests) into a relatively large buffer that is sized to match the bandwidth delay product to the host memory. Notably, the size of this response reordering queue is independent of the number of network interface cores and can be readily shared between them using relatively small demultiplex logic.

The response reordering queue is a large structure (in terms of silicon area) that can be effectively shared between multiple network interface cores. Because it is sized based on the bandwidth and round trip latency of the host processor link, it does not grow in size, speed, or complexity when sharing it between multiple network interface cores.

Reliability logic can provide an end-to-end retransmission capability to improve the reliability of the network. To accomplish this, the reliability logic maintains a copy of all of the data that has been transmitted until an acknowledgment is received for that piece of data. Like the response reordering queue for sharing the processor link, the size of this buffer is matched to the round-trip bandwidth delay product of the network and is independent of the number of network interface cores. By unifying the network interface cores into a single retransmit buffer, it is possible for the network interface cores to share this large (in terms of silicon area) resource.

The retransmit buffer for the reliability logic and the reliability checking logic itself (e.g., CRC (cyclic redundancy check) logic) are large, complex structures (in terms of silicon area) that can be effectively shared between multiple network interface cores. Because the buffer and associated logic must be provisioned based on the peak bandwidth and round trip latency of the network link for the worst case path in the system, they do not grow (significantly) in size, speed, or complexity when shared between multiple network interface cores.

Address translation comes in two forms. The first is the translation from the applications logical view of the machine (MPI rank, SHMEM PE (shared memory processing element), or equivalent) into a physical address (physical network identifier and process identifier). This can involve an extremely large table lookup that consumes large amounts of RAM on the network interface. Like the reliability logic and the host interface logic, this table lookup must be provisioned in size and speed to handle the peak command rate for the network on the transmit side. In general, this peak command rate is only constrained by the bandwidth from the host processor to the network interface. Thus, using multiple network interface cores has no impact on its size or speed.

The second form of address translation is the mapping of virtual addresses (typically used by applications) to physical addresses (needed for bus transactions). In the simple case (e.g., a lightweight kernel operating system on the host processor), this mapping is trivial; however, when a typical operating system (e.g., Linux) is used, the page translation overhead is significant. This tends to lead to dedicated hardware on the network interface to manage these translations. This hardware can maintain either per process or per network interface state. If maintaining per process state, the address translation logic should be partitioned among the network interfaces. In the more common case, network interfaces attempt to manage address translation state dynamically based on incoming traffic. As with the sharing of the host processor links, this scenario leads to translation logic that is design to match the speed of the host processor link with a cache of state that is similarly matched to the speed of the host processor link. Thus, this relatively large resource can be shared among the network interface cores.

Turning to the router-side operability and X-bar2 16, on the transmit side, the data stream from multiple network interface cores is multiplexed at the reliability logic before it reaches the router port. On the receive side, however, novel logic is required to properly demultiplex incoming data to the correct network interface core for processing.

A key insight here is that the MPI ordering constraints require that messages from node A to node B must be processed in the order that they were initiated on node A. Furthermore, potentially matching "posted receives" at node B must be examined in the order that they were posted. For this reason, a receiving process will typically be bound to a single network interface core. It is preferred that the router port use a content addressable memory (CAM) based lookup to route the packet to the correct network interface based on the process ID as shown in FIG. 3.

Figure 3:
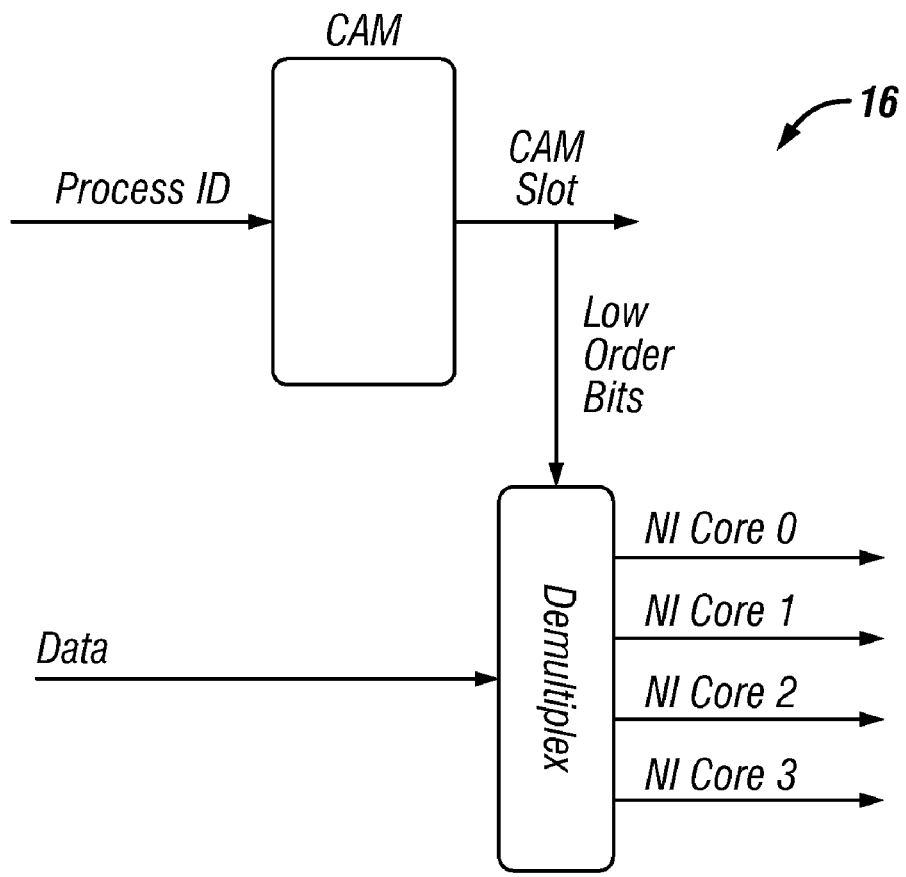
FIG. 3 is a block diagram of the X-bar2 unit of the invention.

The scheme in FIG. 3 works by sizing the CAM to match the maximum number of supported processes. When a process is bound to a network interface core, its process ID is written to a free CAM slot whose low order bits match the network interface core that the process was mapped to. As messages arrived, the associative match of the CAM generates the CAM slot number. The low order bits of the CAM slot number are then used to determine which network interface core that the message should be routed to.

This raises the issue of load balancing. If it is desirable to map an uneven distribution of processes to the network interface cores, then this static allocation of CAM slots to network interface cores would be undesirable. In that case, the CAM structure would need to return a programmable tag instead of the CAM slot number. This programmable tag could be set whenever the process was bound to a network interface core and would alleviate the static mapping between CAM slots and network interface cores.

The remaining dominant area users on a network interface core are pieces of state that are managed on a per process basis. In a multi-core or many-core host processor, it is expected that there will be numerous processes accessing the network interface; thus, resources required to support these processes can be partitioned among the network interface cores with extremely little loss of flexibility. These per process resources are one of the dominant uses of state (and therefore silicon area) on a network interface core; thus, recognizing that they can be partitioned rather than duplicated is a key observation to support using multiple network interface cores.

Figure 4:
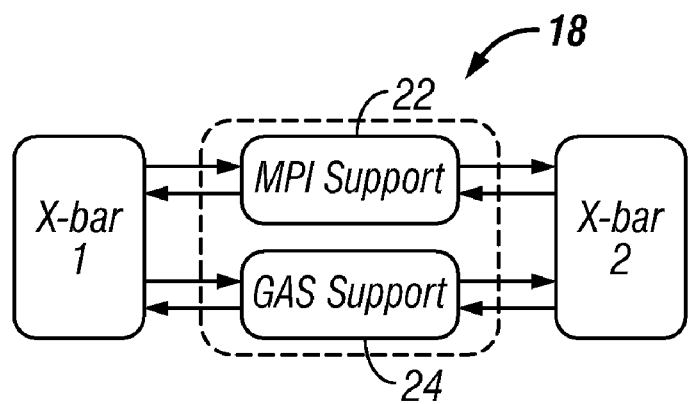
FIG. 4 is a notional block diagram of each network interface core of the invention.
Figure 5:
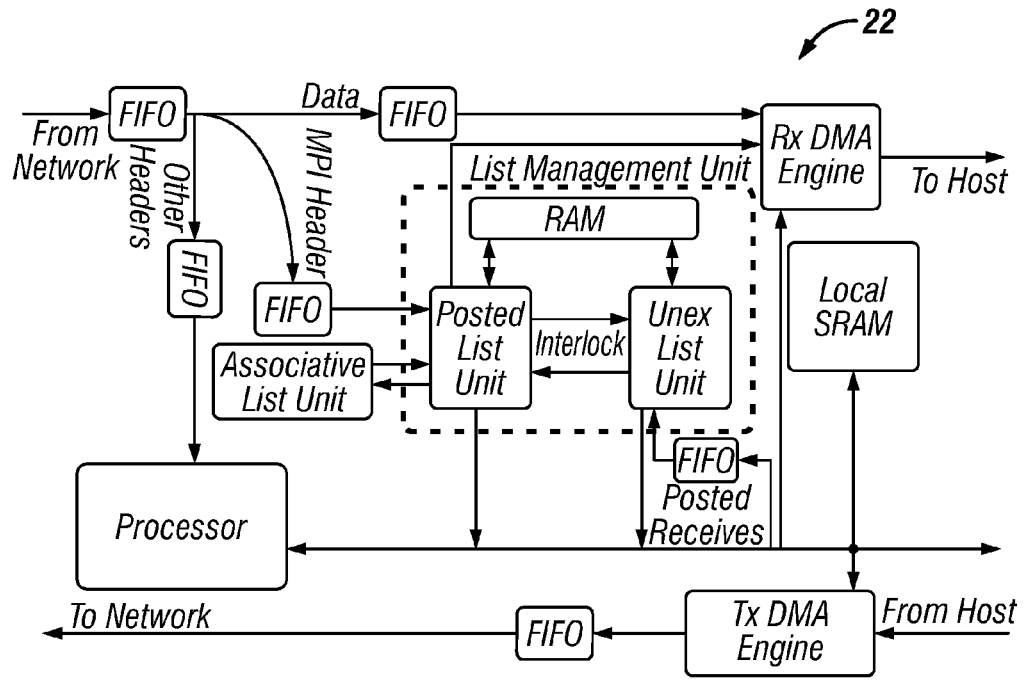
FIG. 5 is a block diagram of MPI support hardware for each network interface core according to the invention.
Figure 6:
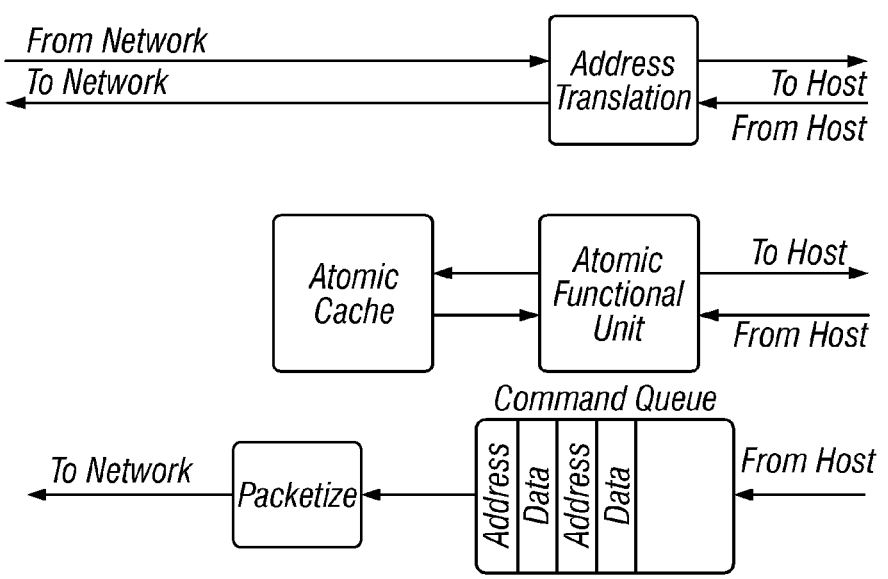
FIG. 6 is a block diagram of partitioned global address space (PGAS) support hardware for each network interface core according to the invention.

FIG. 4 presents a notional network interface core arrangement in which the core 18 comprises support blocks for both MPI 22 and PGAS 24 programming models. FIGS. 5 and 6 present examples of an embodiment of what can be included in MPI support and PGAS support blocks, respectively.

In looking at FIGS. 5 and 6, one sees several resources that are per process resources. The RAM associated with a posted list unit or unexpected list unit is a receive side resource that is sized based on the number of processes it must support. For example, if a posted receive queue of 1024 elements is desired per process, each posted receive queue entry is 64 bytes, and 4 processes must be supported, then 256 KB of RAM will be provided. When multiple network interface cores are provided, processes on the receive side are bound to at most one network interface core; thus, the resources can be partitioned among the network interface cores. Returning to the example, if the 4 processes supported were divided among 2 network interface cores, only 128 KB of memory would need to be provided per core. Similarly, command queues and caches are typically sized and managed based on the number of processes that are supported and could be partitioned among the network interface cores.

Load balancing for the receive logic has to be done at the process level, because MPI ordering constraints require that all posted receives be traversed in order. However, transmits from a given process can be performed by any of the network interface cores as long as ordering is preserved at the recipient. A shared piece of logic can easily perform load balancing of transmit commands between the multiple network interfaces based on a variety of criteria. One option would be to direct a new command to the network interface core that has transmitted the least total bytes. A second approach would consider the network interface core with the fewest unprocessed commands as the least loaded and use it. Since all commands are not equal, the load balancing logic could track the "work remaining" for a given network interface core and use the least loaded network interface core for the next command.

Preserving ordering at the recipient can be achieved in a variety of ways. One approach (used by networks that allow adaptive routing) is to tag each message with a sequence so that in the event that two messages between a given pair of processes happen to pass each other in the network, the receiving NIC can restore the original order. A second alternative is to maintain ordering at the initiator by tagging commands with sequence numbers so that they can be sorted before entering the router. A third approach would be to augment the load balancing logic with a "sticky" characteristic that binds commands from a given process to a specific network interface core until all outstanding commands from that process have completed locally.

At the software level, the network API needs to be cognizant of load balancing to effectively use multiple network interface cores. The crudest load balancing mechanism can occur when the network interface is initialized by a process and mapped into that process's address space. This approach is likely to be sufficient when the number of host processor cores is large relative to the number of network interface cores.

The allocation of processor cores to network interface cores need not be static. It will, however, require that the software ensure that the hardware is in a known state—preferably with all outstanding transactions completed—so that transmits and receives can be stopped and mapped to another network interface core.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A network interface controller apparatus comprising:
   a plurality of network interface cores on a single integrated circuit;
   a first multiplexer for communications between said plurality of network interface cores and one or more host processors;
   a second multiplexer for communications between said plurality of network interface cores and a network router; and
   a content addressable memory between the network router and said second multiplexer; and
   wherein said content addressable memory comprises slots in which the low order bits of the slot number determine the network interface core associated with such slot.

2. The apparatus of claim 1 additionally comprising a response reordering queue between the one or more host processors and said first multiplexer.

3. The apparatus of claim 1 wherein each of said plurality of network interface cores supports a plurality of parallel programming models.

4. The apparatus of claim 3 wherein each of said plurality of network interface cores supports both Message Passing Interface and Partitioned Global Address Space programming models.

5. The apparatus of claim 4 wherein each of said plurality of network interface cores supports both Message Passing Interface and Partitioned Global Address Space programming models, employing discrete hardware for the two.

6. A network interface control method comprising the steps of providing a single integrated circuit as a network interface controller, employing a plurality of network interface cores on the single integrated circuit, using a first multiplexer for communications between the plurality of network interface cores and one or more host processors, using a second multiplexer for communications between the plurality of network interface cores and a network router, and using a content addressable memory between the network router and the second multiplexer, wherein the content addressable memory comprises slots in which the low order bits of the slot number determine the network interface core associated with such slot.

7. The method of claim 6 additionally comprising using a response reordering queue between the one or more host processors and the first multiplexer.

8. The method of claim 6 wherein each of the plurality of network interface cores supports a plurality of parallel programming models.

9. The method of claim 8 wherein each of the plurality of network interface cores supports both Message Passing Interface and Partitioned Global Address Space programming models.

10. The method of claim 9 wherein each of the plurality of network interface cores supports both Message Passing Interface and Partitioned Global Address Space programming models, employing discrete hardware for the two.

* * * * *